US005264785A

United States Patent [19]

Greason

[11] Patent Number: 5,264,785

[45] Date of Patent: Nov. 23, 1993

[54] VOLTAGE-CONTROLLED RESISTANCE ELEMENT WITH SUPERIOR DYNAMIC RANGE

[75] Inventor: Jeffrey K. Greason, Portland, Oreg.

[73] Assignee: Intel Corporation, Santa Clara, Calif.

[21] Appl. No.: 831,697

[22] Filed: Feb. 4, 1992

[51] Int. Cl.[5] .............................................. G05B 24/02

[52] U.S. Cl. ...................................... 323/350; 323/313

[58] Field of Search ............... 323/350, 352, 313, 311, 323/312, 314, 315

[56] References Cited

U.S. PATENT DOCUMENTS

| | | | |
|---|---|---|---|
| 3,761,741 | 9/1973 | Hoeft | 307/237 |
| 4,333,047 | 6/1982 | Flink | 323/311 |
| 4,339,677 | 7/1982 | Hoeft | 307/564 |
| 4,700,124 | 10/1987 | Andersen | 323/225 |
| 5,120,994 | 6/1992 | Joly | 307/296.6 |

*Primary Examiner*—R. Skudy
*Assistant Examiner*—Ben Davidson
*Attorney, Agent, or Firm*—Blakely, Sokoloff, Taylor & Zafman

[57] ABSTRACT

An MOS voltage-controlled resistor is disclosed. The voltage-controlled resistor comprises a first triode MOSFET, a second triode MOSFET, and a single diode connected MOSFET. The single diode connected MOSFET is coupled in series with the first triode MOSFET. These two MOSFETs in series, are in turn, coupled in parallel with the second triode MOSFET. A control voltage, $V_{CONTROL}$, is applied from the gates to the sources of the first and second triode MOSFETs. A voltage-controlled resistance can then be measured between the two nodes defining the parallel coupling of, the single diode connected MOSFET in series with the first triode MOSFET, with the second triode MOSFET.

12 Claims, 4 Drawing Sheets

VOLTAGE-CONTROLLED RESISTANCE ELEMENT WITH SUPERIOR DYNAMIC RANGE

BACKGROUND OF THE INVENTION

1. Field of the Invention

This invention relates to the field of resistive elements, and more particularly, to a MOS voltage controlled linear resistor with superior dynamic range.

2. Art Background

Electrical circuits frequently require the use of resistive elements. Resistive elements, or resistors, can take any number of forms. One such resistor is the voltage-controlled resistor wherein the resistive value can be variably adjusted through the use of a control voltage. Voltage-controlled resistors find numerous applications, including use in PLL clock generators, adjustable amplifiers, and adjustable filters. A voltage-controlled resistor preferably provides a linear response over as wide a dynamic range as possible.

In a recent Transaction Brief published in the October 1990 "IEEE Transactions On Circuits And Systems," (Vol. 37, No. 10), three authors, G. Moon, M. E. Zaghloul, and R. W. Newcomb, disclosed an enhancement-mode MOS voltage-controlled linear resistor. In this disclosure, the authors describe a voltage-controlled linear resistor wherein a triode MOSFET is coupled in parallel to a diode connected MOSFET, and a control voltage is applied to the gate of the triode MOSFET. Although this voltage-controlled resistor provides certain advantageous characteristics, it suffers from a number of shortcomings. Principal among these is its limited dynamic range, or range of possible resistive values. In particular, this voltage-controlled resistor offers limited performance at low control voltages.

As will be described, the present invention provides for an MOS voltage-controlled linear resistor with considerable dynamic range. In particular, the present invention yields a dynamic range which is superior to the dynamic range of the voltage-controlled resistor disclosed by Moon, Zaghloul, and Newcomb. The present invention incorporates a first triode MOSFET, a second triode MOSFET, and a single diode connected MOSFET to yield a superior MOS voltage-controlled linear resistor.

SUMMARY OF THE INVENTION

An MOS voltage-controlled resistor is disclosed. The voltage-controlled resistor comprises a first triode MOSFET, a second triode MOSFET, and a single diode connected MOSFET. The single diode connected MOSFET is coupled in series with the first triode MOSFET. These two MOSFETs in series, are in turn, coupled in parallel with the second triode MOSFET. A control voltage, $V_{CONTROL}$, is applied from the gates to the sources of the first and second triode MOSFETs. A voltage-controlled resistance can then be measured between the two nodes defining the parallel coupling of, the single diode connected MOSFET in series with the first triode MOSFET, with the second triode MOSFET.

The present invention provides a voltage-controlled resistor which can be advantageously utilized at low control voltages. The present invention thereby provides a voltage controlled resistor with substantial dynamic range. The dynamic range of the present invention is superior, in particular, to that of a recently disclosed voltage-controlled resistor.

BRIEF DESCRIPTION OF THE DRAWINGS

Further details are explained below with the help of the examples illustrated in the attached drawings in which.

DETAILED DESCRIPTION OF THE INVENTION

A voltage-controlled resistor having superior dynamic range is described. In the following description, for purposes of explanation, specific details and values are set forth in order to provide a better understanding of the present invention. It will be appreciated by one skilled in the art, however, that the present invention can be understood and practiced without reference to such specific details and values. In particular, the present invention finds widespread application in a wide variety of circuits, each circuit having its own unique values and characteristics.

Figure 1:
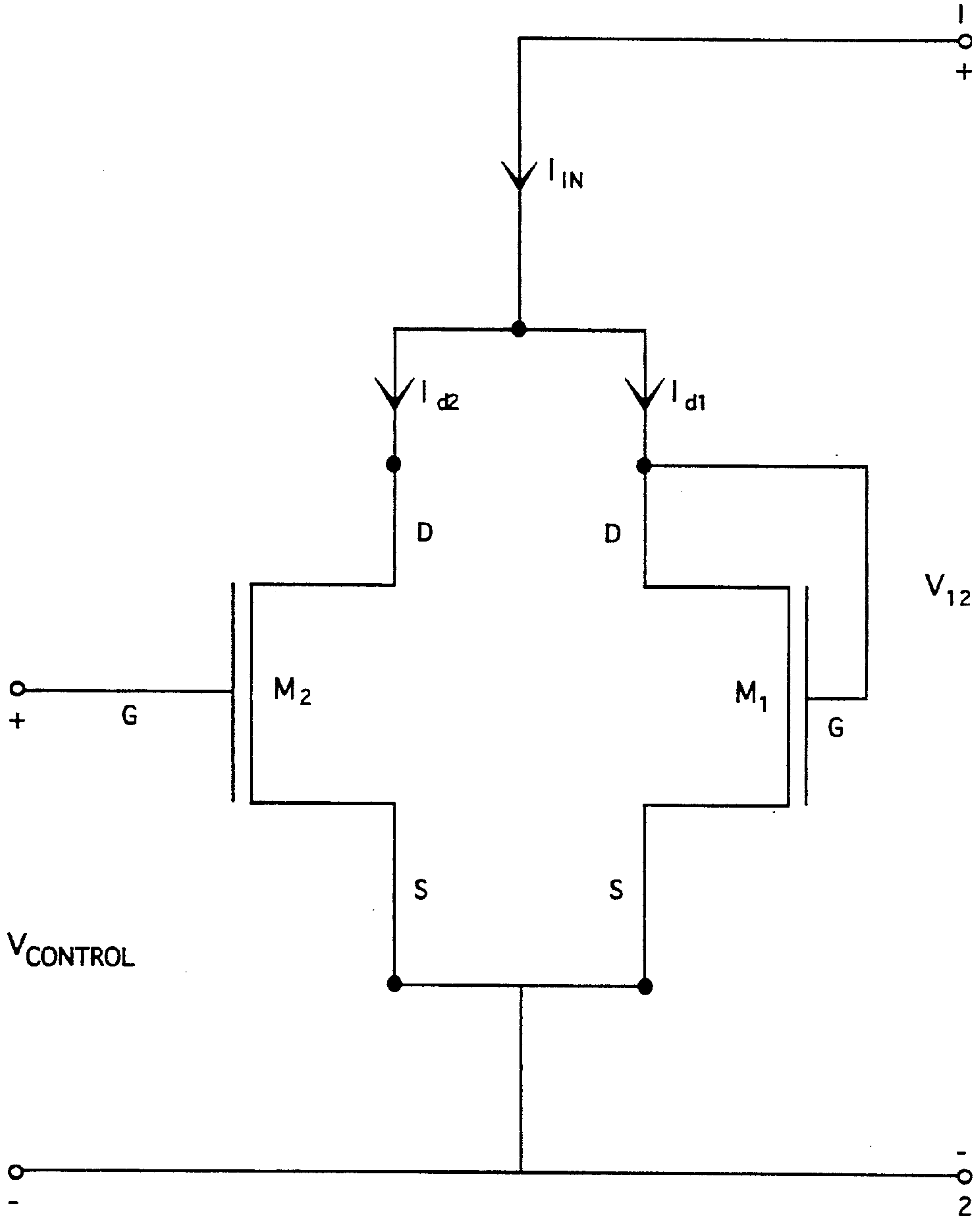
Figure 1 Prior Art
FIG. 1 illustrates the voltage-controlled resistor disclosed by Moon, Zaghloul, and Newcomb.

Referring now to FIG. 1, this figure illustrates a voltage-controlled resistor disclosed by Moon, Zaghloul, and Newcomb in the "IEEE Transactions On Circuits And Systems," (Vol. 37, No. 10, October 1990). As illustrated in this figure, a first diode connected MOSFET device, $M_1$, is coupled in parallel with a second triode MOSFET device, $M_2$. In particular, the drain of $M_1$ is coupled to the drain of $M_2$ (and the gate of $M_1$ itself), while the source of $M_1$ is coupled to the source of $M_2$. A control voltage, $V_{CONTROL}$ is applied to the gate of $M_2$. When in use as a voltage-controlled resistor, a voltage $V_{12}$ is applied from the coupling of the drains of $M_1$ and $M_2$, to the coupling of the sinks of $M_1$ and $M_2$. A current $I_{d2}$ flows into the drain of $M_2$, and a current $I_{d1}$ flows into the drain of $M_1$. These two currents, summed together, equal $I_{IN}$, the total current through the voltage-controlled resistor.

Figure 2:
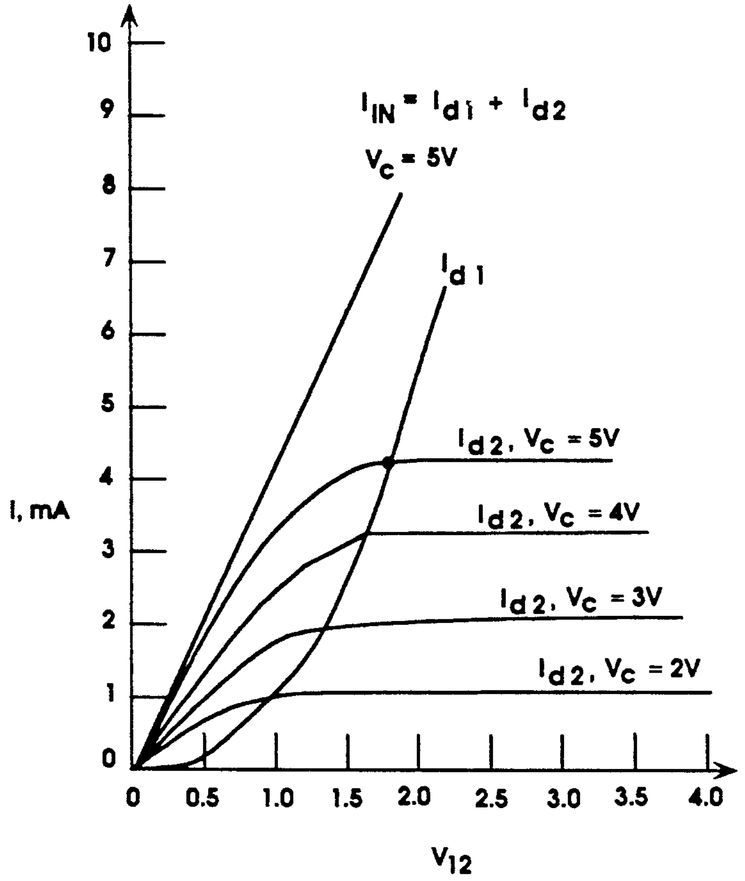
Figure 2 Prior Art
FIG. 2 illustrates the I-V characteristics of the voltage-controlled resistor disclosed by Moon, Zaghloul, and Newcomb.

Referring to FIG. 2, this figure illustrates sample I-V characteristics for the voltage-controlled resistor disclosed by Moon, Zaghloul, and Newcomb. It should be noted that particular voltages and currents are shown in this figure for illustrative purposes only, in order to show, in general, the I-V characteristics of the voltage controlled resistor at higher and lower voltages. These values are not, perforce, values specifically realized. In FIG. 2, the x-axis corresponds to the voltage $V_{12}$ applied to the voltage controlled resistor, while the y-axis corresponds to resulting current. A family of curves for $I_{d2}$ is shown for various control voltages, $V_C$, illustrating the fact that the $I_{d2}$-$V_{12}$ characteristics vary with the control voltage. A single curve is shown for $I_{d1}$, underscoring the fact that $I_{d1}$ is not dependent upon the control voltage. Lastly, a single curve is shown for $I_{IN}$, the sum of $I_{d1}$ and $I_{d2}$, at a control voltage, $V_C$ of 5 volts. It will be appreciated that for this high control voltage, the $I_{IN}$-$V_{12}$ relationship is essentially linear as desired. Hence, at this high control voltage, the voltage controlled resistor disclosed by Moon, Zaghloul, and Newcomb yields a relatively linear or constant resistive value over an appreciable range of applied voltages.

Figure 3:
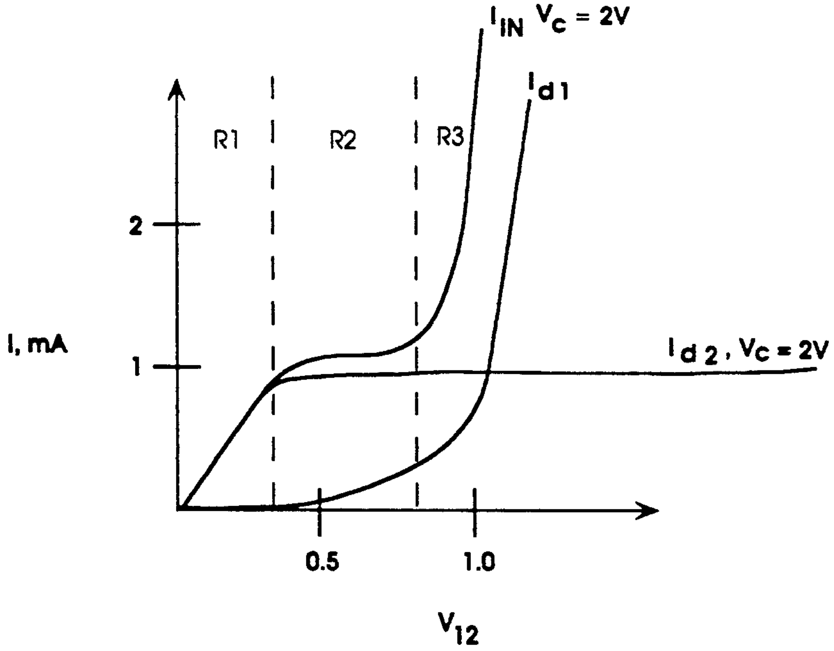
Figure 3 Prior Art
FIG. 3 illustrates the I-V characteristics, of the voltage-controlled resistor disclosed by Moon, Zaghloul, and Newcomb at a lower control voltage.

Referring now to FIG. 3, this figure illustrates for the voltage-controlled resistor of Moon, Zaghloul, and Newcomb, the curves corresponding to $I_{d1}$, $I_{d2}$, and $I_{IN}$ at $V_{CONTROL}=2$. Again, it should be noted that specific voltages and currents are shown in this figure for illustrative purposes only. As can be seen from this figure, the $I_{IN}$ curve is not consistently linear at this low control voltage. In particular, the voltage-controlled resistor has three distinct regions of operation. In Region 1 (R1), the voltage-controlled resistor looks like a triode MOSFET in the ohmic region, providing a first resistive value. In Region 2 (R2), the voltage-controlled resistor looks like like a current source with very little change in the current with increases in the voltage $V_{12}$ applied. In Region 3 (R3), the region of operation spanning the greatest range of applied voltages, the voltage controlled resistor looks like a simple diode connected MOSFET. The $I_{IN}$ curve thus resembles a step curve, with a flat portion in Region 2 and a steep portion in Region 3. The variation in slope experienced between the flat portion in Region 2 and the steep portion in Region 3 can create particularly significant problems in numerous applications, including for example, a PLL clock generator.

Thus, referring to FIGS. 1, 2 and 3, it will be appreciated that the voltage-controlled resistor disclosed by Moon, Zaghloul, and Newcomb suffers from significant shortcomings. At low control voltages the voltage-controlled resistor does not provide a reasonably linear $I_{IN}$-$V_{12}$ characteristic. This shortcoming might arguably be tempered with the realization that the voltage-controlled resistor does provide a reasonably linear response throughout Region 3. However, limiting the operation of the resistor to Region 3 operation to achieve a desired linear response effectively means that for low control voltages, this voltage-controlled resistor will necessarily be limited to the characteristic of the diode connected MOSFET, $M_1$. This represents a substantial limitation, one which dooms this voltage-controlled resistor to a limited dynamic range of possible resistive values.

In sum, continuing to refer to FIGS. 1, 2, and 3, the voltage-controlled resistor disclosed by Moon, Zaghloul, and Newcomb is reasonably linear only for high control voltages, voltages which are high enough to keep the triode MOSFET $M_2$ from saturating. At low control voltages, the voltage-controlled resistor is, at best, limited to the I–V characteristics of the diode connected MOSFET $M_1$. The dynamic range of possible resistive values, the amount of control or the range over which one can control the resistance of this resistor, is accordingly limited.

Figure 4:
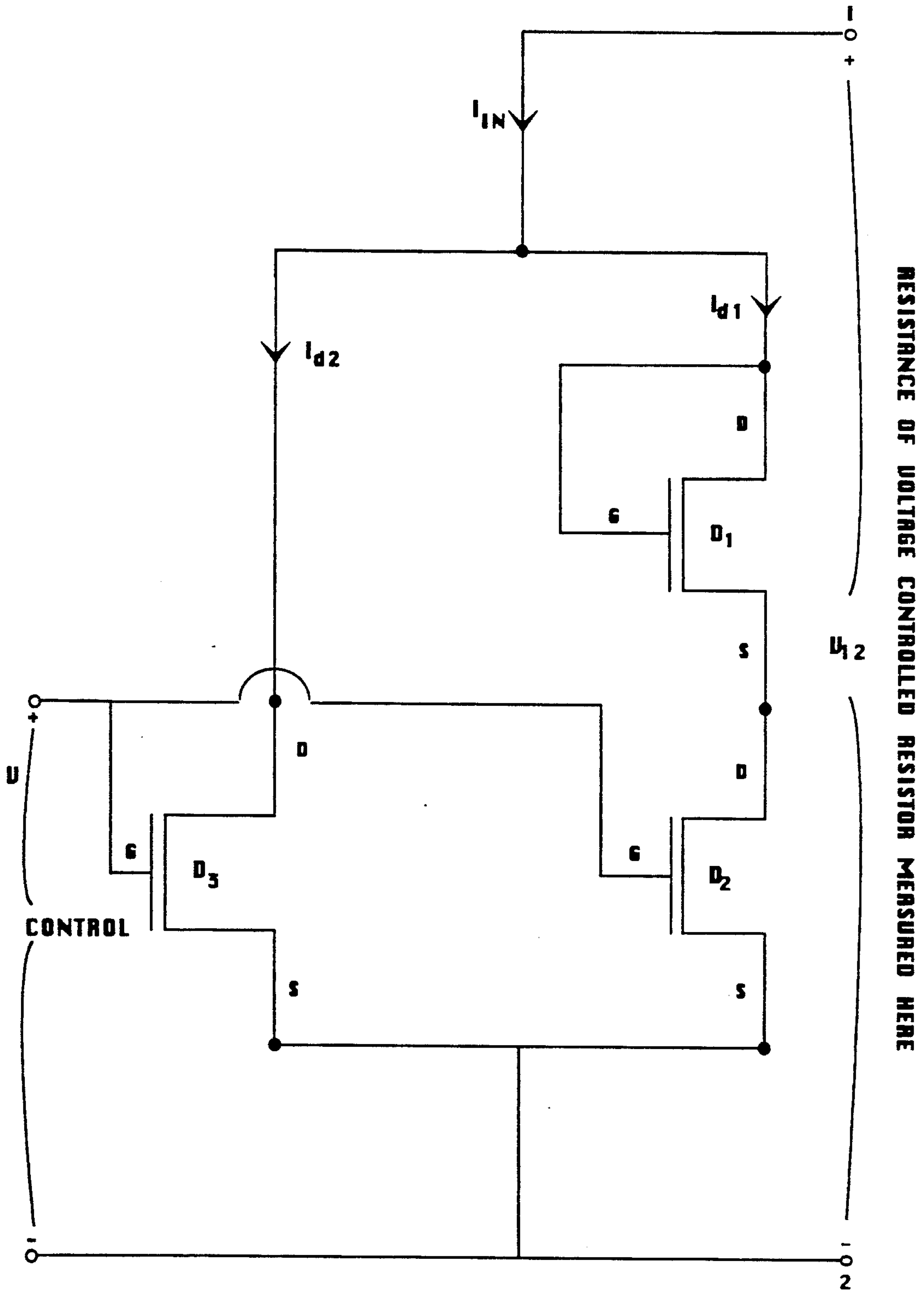
FIG. 4 illustrates the voltage controlled resistor of the present invention.

Referring now to FIG. 4, this figure illustrates the voltage-controlled resistor of the present invention. As illustrated, a first MOSFET device $D_1$ is coupled in series with a second MOSFET device $D_2$. MOSFET device $D_1$ and MOSFET device $D_2$ are, in turn, coupled in parallel with MOSFET device $D_3$. In particular, the drain of $D_1$ is coupled to the drain of $D_3$ and the gate of $D_1$. The source of $D_1$ is coupled to the drain of $D_2$. The source of $D_2$ is coupled to the source of $D_3$, and the gate of $D_2$ is coupled to the gate of $D_3$. A control voltage, $V_{CONTROL}$, is applied from the gates of $D_2$ and $D_3$ to the soures of $D_2$ and $D_3$. A voltage $V_{12}$ is then applied from the coupling of the drains of $D_1$ and $D_3$, to the coupling of the sources of $D_2$ and $D_3$. A current $I_{d2}$ flows into the drain of $D_3$, and a current $I_{d1}$ flows into the drain of $D_1$. These two currents, summed together, equal $I_{IN}$, the total current through the voltage-controlled resistor of the present invention.

Figure 5:
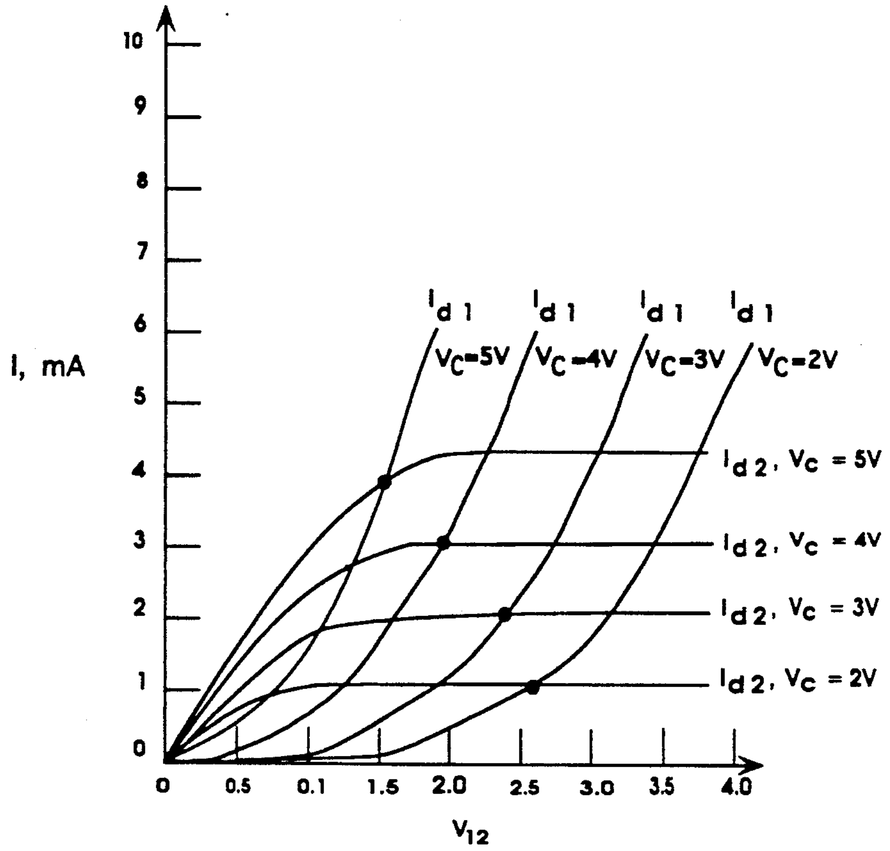
FIG. 5 illustrates the I-V characteristics of the present invention.

Referring to FIG. 5, this figure illustrates sample I–V characteristics for the voltage-controlled resistor of the present invention. Again, it should be noted that particular voltages and currents are provided in this figure for illustrative purposes only, in order to show, in general, the I–V characteristics of the present invention at higher and lower voltages. In this figure, the x-axis corresponds to the voltage $V_{12}$, while the y-axis corresponds to resulting current. A family of curves for $I_{d2}$ is shown for various control voltages, $V_C$. Similarly, and significantly, a family of curves is shown for $I_{d1}$, underscoring the fact that in the present invention, $I_{d1}$ is also dependent upon the control voltage.

Referring now to FIGS. 4 and 5, in the present invention, $D_2$ is advantageously chosen such that for high control voltages, $V_{CONTROL}$, its resistance is much smaller than the resistance of $D_1$. Thus, if $V_{CONTROL}$ is very high, $D_2$ provides very low resistance. The resulting $I_{d1}$ curve resembles the curve one might expect from $D_1$ standing alone. As $V_{CONTROL}$ is lowered, however, $D_2$ provides greater and greater resistance in series with $D_1$ such that the $I_{d1}$ curve begins to flatten out, reflecting this greater and greater resistance. As indicated earlier, $I_{d1}$ is summed with $I_{d2}$ to provide $I_{IN}$. Thus, from FIG. 5, it will be appreciated from the $I_{d1}$ curves and $I_{d2}$ curves illustrated that the voltage-controlled resistor of the present invention provides for a considerable dynamic range of possible resistance values.

Figure 6:
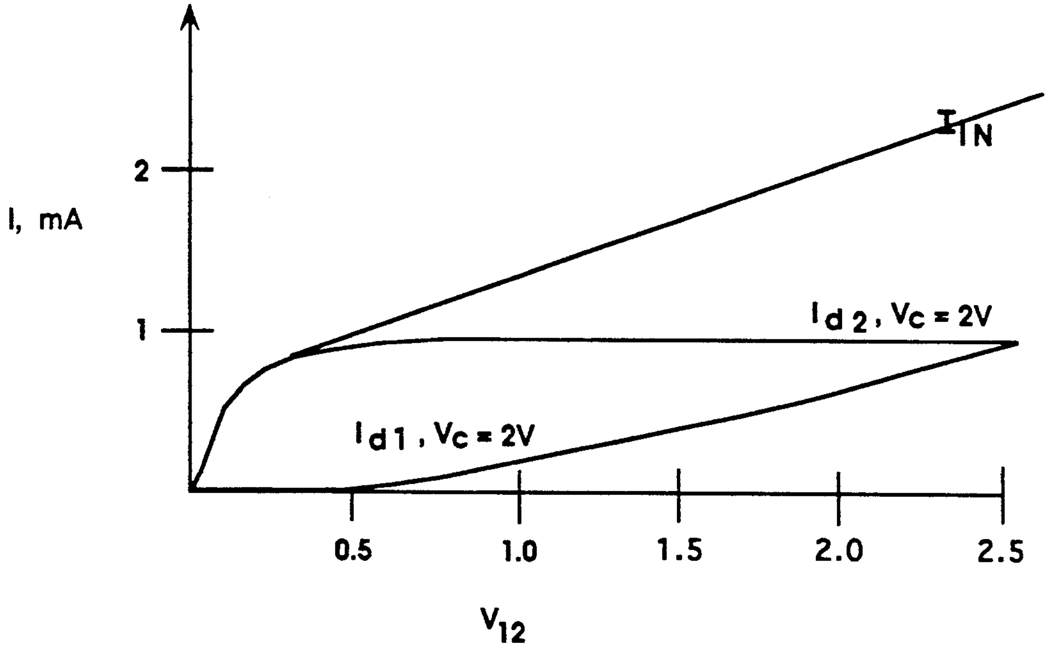
FIG. 6 illustrates the I-V characteristics, of the present invention at a lower control voltage.

Referring now to FIG. 6, this figure illustrates for the present invention the curves corresponding to $I_{d1}$, $I_{d2}$, and $I_{IN}$ at $V_{CONTROL}=2$. Again, it should be noted that specific voltages and currents have been chosen for this figure for illustrative purposes only. The $I_{IN}$ curve illustrated in FIG. 6 can be contrasted to the $I_{IN}$ curve illustrated in FIG. 3. In particular, the step or flat portion of $I_{IN}$ evident in FIG. 3, is absent in FIG. 6. As a result, in contrast to the voltage-controlled resistor disclosed by Moon, Zaghloul, and Newcomb, the present invention can readily be utilized at lower control voltages.

Thus, the present invention provides a controllable resistance element which is reasonably linear across a wide range of resistance values. In particular, the present invention provides a controllable resistance element which is reasonably linear at low control voltages. The present invention can be utilized at low control voltages in a wide variety of circuits, including PLL clock generators, adjustable filters, and adjustable amplifiers.

While the present invention has been particularly described with reference to FIGS. 1 through 6, and with emphasis on certain circuit components, it should be understood that the figures are for illustration only and should not be taken as limitations upon the invention. In particular, while the present invention has been described and illustrated herein using N-MOSFET devices, the present invention can readily be implemented with P-MOSFET devices or JFET devices. It is additionally clear that the methods and apparatus of the present invention have widespread utility in a wide variety of electrical circuits. References to certain circuits, and the absence of specific, exhaustive references to each and every circuit in which the present invention can be advantageously utilized should not be taken as an expression of any limitation upon the understood, widespread applicability of the present invention. It is further contemplated that many changes and modifications may be made, by one of ordinary skill in the art, without departing from the spirit and scope of the invention as disclosed herein.

I claim:

1. A voltage-controlled resistor comprising:

a first transistor having a gate, a source, and a drain, wherein said gate is coupled to said drain;

a second transistor having a gate, a source, and a drain, wherein said drain of said second transistor is coupled to said source of said first transistor;

a third transistor having a gate, a source, and a drain, wherein said gate of said third transistor is coupled to said gate of said second transistor, said drain of said third transistor is connected directly to said drain of said first transistor, and said source of said third transistor is coupled to said source of said second transistor.

2. The voltage-controlled resistor provided in claim 1 wherein said first transistor, said second transistor, and said third transistor comprise MOSFET devices.

3. The voltage-controlled resistor provided in claim 1 wherein said first transistor, said second transistor, and said third transistor comprise N-MOSFET devices.

4. The voltage-controlled resistor provided in claim 1 wherein said first transistor, said second transistor, and said third transistor comprise P-MOSFET devices.

5. The voltage-controlled resistor provided in claim 1 wherein said first transistor, said second transistor, and said third transistor comprise JFET devices.

6. A method for providing a voltage controlled resistor, said resistor having three terminals A, B, and C, said method comprising:

coupling a first transistor having a gate, a source, and a drain to terminal A such that said gate and said drain are connected directly to terminal A;

coupling a second transistor having a gate, a source, and a drain to said first transistor, terminal B, and terminal C, such that said drain of said second transistor is coupled to said source of said first transistor, said source of said second transistor is coupled to terminal B, and said gate of said second transistor is coupled to terminal C;

coupling a third transistor having a gate, a source, and a drain, to terminal A, terminal B, and terminal C, such that said drain of said third transistor is connected directly to terminal A, said source of said third transistor is coupled to terminal B, and said gate of said third transistor is coupled to terminal C;

impressing a control potential across terminals C and B, thereby providing a voltage controlled resistance across terminals A and B.

7. The method for providing a voltage controlled resistor as provided in claim 6 wherein the resistance of said resistor is measured from terminal A to terminal B.

8. The method for providing a voltage controlled resistor as provided in claim 7 wherein said first transistor, said second transistor, and said third transistor comprise MOSFET devices.

9. The method for providing a voltage controlled resistor as provided in claim 7 wherein said first transistor, said second transistor, and said third transistor comprise N-MOSFET devices.

10. The method for providing a voltage controlled resistor as provided in claim 7, wherein said first transistor, said second transistor, and said third transistor comprise P-MOSFET devices.

11. The method for providing a voltage controlled resistor as provided in claim 7 wherein said first transistor, said second transistor, and said third transistor comprise JFET devices.

12. A voltage-controlled resistor comprising:

a first transistor having a gate, a source, and a drain, wherein said gate is coupled to said drain;

a second transistor having a gate, a source, and a drain, wherein said drain of said second transistor is coupled to said source of said first transistor;

a third transistor having a gate, a source, and a drain, wherein said gate of said third transistor is coupled to said gate of said second transistor, said drain of said third transistor is connected directly to said drain of said first transistor, and said source of said third transistor is connected directly to said source of said second transistor;

wherein a controlling voltage is applied from said gate of said third transistor to said source of said second transistor, and a resulting resistance is measured from said drain of said first transistor to said source of said second transistor.

* * * * *